United States Patent [19]

Allen

[11] Patent Number: 4,903,732
[45] Date of Patent: Feb. 27, 1990

[54] PIEZOELECTRIC VALVE

[75] Inventor: Alton K. Allen, Great Neck, N.Y.

[73] Assignee: A. K. Allen Company, Mineola, N.Y.

[21] Appl. No.: 300,564

[22] Filed: Jan. 19, 1989

[51] Int. Cl.$^4$ ........................................ F15B 13/044
[52] U.S. Cl. ............................ 137/625.65; 251/129.06
[58] Field of Search ................ 137/625.65; 251/129.06

[56] References Cited

U.S. PATENT DOCUMENTS

| | | |
|---|---|---|
| 2,928,409 | 3/1960 | Johnson et al. . |
| 3,465,732 | 9/1969 | Kattchee . |
| 3,524,474 | 8/1970 | McCormick . |
| 3,981,480 | 9/1976 | Eernisse et al. . |
| 4,018,241 | 4/1977 | Sodal et al. . |
| 4,100,798 | 7/1978 | Nilsson et al. . |
| 4,166,605 | 9/1979 | Hall et al. . |
| 4,176,822 | 12/1979 | Chadwick . |
| 4,284,263 | 8/1981 | Newcomb . |
| 4,298,181 | 11/1981 | Corrado et al. . |
| 4,340,083 | 7/1982 | Cummins . |
| 4,472,091 | 9/1984 | Callahan . |
| 4,492,360 | 1/1985 | Lee et al. . |
| 4,501,406 | 2/1985 | Walther et al. . |
| 4,535,810 | 8/1985 | Duder et al. ............... 137/625.65 X |
| 4,545,561 | 10/1985 | Brown ............................ 251/129.08 |
| 4,610,426 | 9/1986 | Brandner . |
| 4,617,952 | 10/1986 | Fujiwara et al. . |
| 4,678,000 | 7/1987 | Kushida . |
| 4,705,059 | 11/1987 | Lecerf et al. . |

FOREIGN PATENT DOCUMENTS

| | | | |
|---|---|---|---|
| 65968 | 4/1985 | Japan | 251/129.06 |
| 171975 | 8/1986 | Japan | 251/129.06 |
| 189374 | 8/1986 | Japan | 251/129.06 |
| 236974 | 10/1986 | Japan | 251/129.06 |
| 159877 | 7/1987 | Japan | 251/129.06 |
| 83473 | 4/1988 | Japan | 251/129.06 |

Primary Examiner—Gerald A. Michalsky
Attorney, Agent, or Firm—Amster, Rothstein & Ebenstein

[57] ABSTRACT

A piezoelectric valve for controlling fluid flow through valve ports comprises a fluidtight valve body and a diaphragm. The valve body defines valve ports, and the diaphragm includes a plurality of piezoelectric members, the members being adapted to be selectively piezoelectrically deflected in opposite directions in a plane of operation thereof to produce a cumulative excursion to selectively block or unblock the valve ports. The enhanced cumulative excursion enables valve ports of greater cross-sectional area to be employed.

23 Claims, 3 Drawing Sheets

PIEZOELECTRIC VALVE

BACKGROUND OF THE INVENTION

The present invention relates to a piezoelectric valve for controlling fluid flow through valve ports and, more particularly, to such a valve having a plurality of piezoelectric members.

Piezoelectric valves offer several advantages relative to comparable solenoid valves, a primary advantage being a much lower power consumption which renders the piezoelectric valve suitable for applications where the power consumption of a solenoid valve renders the latter unsuitable. For example, a piezoelectric valve is suitable for battery-powered operation in locations where its operation may be activated remotely by radio signals. The piezoelectric valve, like the conventional solenoid valve, may be used to control fluid flow through one valve port or two valve ports, depending upon the desired application.

The diaphragm of a conventional piezoelectric valve comprises a flexible metal substrate to which a piezoelectric material is attached. A single piezoelectric diaphragm including a metal substrate approximately 0.005 inch in thickness and piezoelectric material 0.007 inch in thickness provides approximately 0.010 inch of travel or excursion between the energized (200 volts D.C.) and de-energized states. Application of higher voltages than are appropriate for the piezoelectric material can result in piezoelectric material fracture or premature failure of the device. Assuming that the single diaphragm is to control two aligned facing valve ports, blocking one port in the energized state and the other valve port in the de-energized state, the diaphragm would include on each face, aligned with an adjacent valve port, a pad of an elastometic material to insure the fluidtight nature of the engagements between the diaphragm and the respective valve ports. Of the 0.010 inch excursion, approximately 0.002 inch at the beginning and at the end of the excursion are "lost" or used to insure engagement of the elastometic material and the valve ports—that is, to insure a fluidtight connection between each pad and its respective valve port. As a result, the usable excursion is limited to approximately 0.006 inch for the diaphragm $(0.006 = 0.010 - (2 \times 0.002))$.

The significance of the usable excursion of the diaphragm arises out of the fact that geometrically the maximum usable diameter of the valve port cannot exceed four times the effective excursion. More particularly, the area through which fluid flow from the valve port can be controlled is effectively limited by the surface area of the sidewall of an imaginary column created between the open valve port and the adjacent surface of the diaphragm (that is, the surface area of an imaginary column having a diameter equal to the effective diameter of the valve port through which fluid flows and a height equal to the usable excursion of the diaphragm) so that $$(\pi D) \times X = \pi (D/2)^2$$

$$D = 4X$$

where D is the diameter of the valve port (and imaginary cylinder), and

X is the excursion (and height of the imaginary cylinder).

By way of example, a usable excursion of 0.006 inch corresponds to a maximum valve port diameter of 0.024 inch. Thus, the aforementioned diaphragm having approximately 0.010 inch of total travel is limited to a valve port diameter of 0.024 inch, assuming that the diaphragm was intended to block one valve port at each end of its excursion. Clearly this limitation severely restricts the volume of fluid which can be controlled at practical fluid flow rates by a piezoelectric valve, and the need remains for a piezoelectric valve which will enable a diaphragm to control valve ports of greater cross-sectional area and corresponding flow rates than is possible with conventional piezoelectric valves.

Accordingly, it is an object of the present invention to provide a piezoelectric valve in which the effective usable excursion of the diaphragm exceeds the usable excursion of a conventional piezoelectric valve using a similar diaphragm.

Another object is to provide such a piezoelectric valve in which the effective usable excursion is more than twice the usable excursion of a conventional piezoelectric valve using a similar diaphragm.

A further object is to provide such a piezoelectric valve which is capable of controlling a valve port having a cross-sectional area greater than the maximum cross-sectional area for a valve port in a conventional piezoelectric valve using a similar diaphragm.

It is also an object to provide such a piezoelectric valve which is of compact and sturdy design, inexpensive to manufacture and easy to maintain.

SUMMARY OF THE INVENTION

It has now been found that the above and related objects of the present invention are obtained in a piezoelectric valve for controlling fluid flow through a valve port. The piezoelectric valve comprises a fluidtight valve body defining a valve port. A diaphragm disposed within the valve body includes a plurality of piezoelectric members, the members being adapted to be selectively piezoelectrically deflected in opposite directions in a plane of operation thereof to produce a cumulative excursion to selectively block or unblock the valve port. Electrical means are operatively connected to the members for piezoelectrically deflecting the same. Preferably the members are adapted to be selectively piezoelectrically deflected between a first orientation wherein the members are bowed apart and a second orientation wherein the members are generally parallel, the members assuming the first orientation when the electrical means are energized to piezoelectrically deflect the members and the second orientation when the electrical means are de-energized so said members are not piezoelectrically deflected. The members may be substantially planar when not piezoelectrically deflected and substantially curved when piezoelectrically deflected.

In a preferred embodiment, the piezoelectric valve controls fluid flow through the valve port and a second valve port. The valve body further defines a second valve port aligned with the valve port, and the valve port is an inlet port and the second valve port is an exhaust port. Piezoelectric deflection of the members to selectively block or unblock the valve port also selectively unblocks or blocks the second valve port. Where there are only a pair of the members, the valve port extends through one of the members, and the other of the members has a first face for selectively blocking or unblocking the valve port and an opposed second face for selectively blocking or unblocking the second valve port.

Preferably the one member has a central annular portion fixed to the valve body about the valve port to thereby substantially double the effective excursion of the other member. An annular element with opposed faces has one face secured to the central annular portion of the one member and the opposite face secured to the valve body about the valve port. Means are provided for biasing the members towards the valve port.

In a preferred embodiment, the valve body additionally defines a third valve port, the third valve port being an inlet/outlet port in fluid communication with an unblocked one of the valve port and the second valve port. The diaphragm additionally includes flow channel means disposed intermediate the members to space the members apart and enable the flow of fluid intermediate the members between the center thereof and the periphery thereof. The flow channel means is annular in configuration and preferably a convoluted washer. The valve port extends through the central annular portion of the one member. An unblocked valve port communicates with the end of the flow channel means adjacent the center of the members, an unblocked second valve port communicates with the third valve port directly, and the third valve port communicates with the end of the flow channel means adjacent the periphery of the members, thereby providing communication between the third valve port and alternately an unblocked one of the valve port and the second valve port. The valve body limits the excursion of one of the members and blocks such excursion in a given direction and thereby substantially doubles the effective excursion of the other of the members in the opposite direction and substantially more than doubles its usable effective excursion. Means are provided for biasing the members in the given direction.

The electrical means are functionally electrically connected to a common electrical circuit for simultaneous piezoelectric deflection of the plurality of members.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
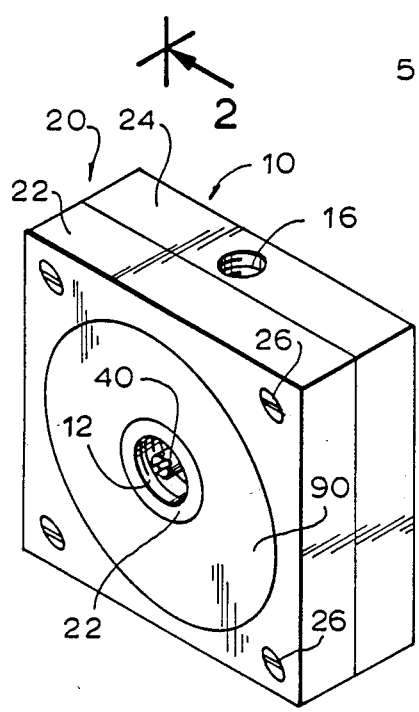
FIG. 1 is an isometric view of a piezoelectric valve according to the present invention.
Figure 4:
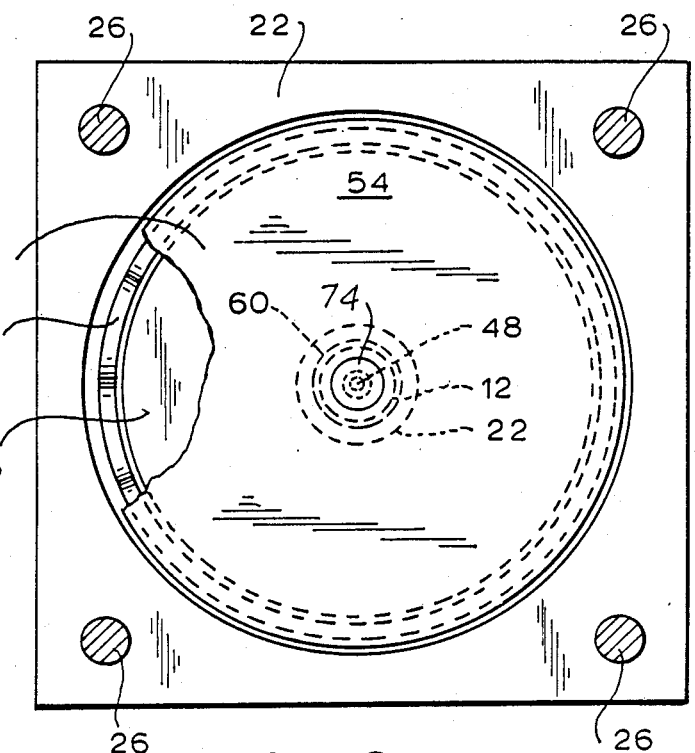
FIG. 4 is a sectional view taken along the line 4—4 of FIG. 2 and in the direction of the arrows, but to a reduced scale, with portions thereof being cut away to reveal details of internal construction.
Figure 5:
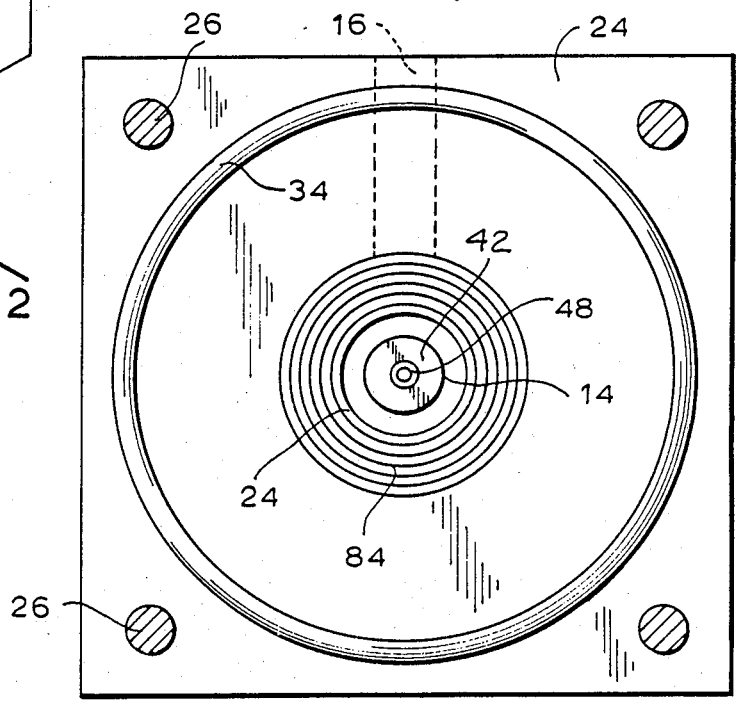
FIG. 5 is a sectional view taken along the line 5—5 of FIG. 2 and in the direction of the arrows, but to a reduced scale.

Referring now to the drawing, and in particular to FIG. I thereof, therein illustrated is a piezoelectric valve, generally designated by the reference numeral 10, according to the present invention. The valve 10 is a 3-way valve adapted to control fluid flow among a first valve port 12, an aligned and opposed second valve port 14, (see FIGS. 2–3 and 5) and a transverse third valve port 16. The first valve port 12, when unblocked, acts as an inlet port and is in fluid communication with the third valve port 16. The second valve port 14, when unblocked, acts as an exhaust port and is in fluid communication with the third valve port 16. The third valve port 16 acts as an inlet/outlet port (that is, at times it acts as an inlet port and at times it acts as an outlet port) and is never blocked. By way of contrast with the third port 16, as will become clear hereinafter, one or the other of the first and second ports 12, 14 is blocked at any given instant, assuming instantaneous deflections and returns by the deflecting valve members.

Such a 3-way valve finds utility in a great many applications. For example, such a valve may be used to control the passage of air or other fluid into a pneumatic cylinder (not shown) and the expulsion of fluid from the cylinder in response to the restorative force of a spring or similar restoring means. In such an application the third or inlet/outlet port 16 is connected to the pneumatic cylinder. With the valve in one functional orientation air or fluid entering the first or inlet port 12 is introduced into the cylinder via the inlet/outlet port 16, the second or exhaust port 14 being blocked, while with the valve in the alternative orientation fluids are expelled from the cylinder into the inlet/outlet port 16 via the exhaust port 14, the inlet port 12 being blocked. The 3 way valve of the present invention is obviously useful in a variety of other applications and two valves may be used in tandem to provide 4-way operation wherein, for example, when one valve is actuated a pneumatic cylinder is caused to extend and when the other valve is actuated the cylinder is caused to retract by the force exerted by air or another fluid (rather than by a spring). Furthermore, the principles of the present invention are equally applicable to 2-way valves.

The valve 10 of the present invention includes a fluid-tight valve body or housing generally designated 20 and composed of an inlet section 22 defining inlet port 12 and an exhaust section 24 defining exhaust port 14. While the size of the housing 20 will vary with particular applications the housing may be, for example, on the order of 1⅜×1⅜×1 inches. In each corner of the housing 20 a screw 26 extends through the inlet section 22 and into the exhaust section 24 to maintain the inlet and exhaust sections 22, 24 in close proximity. Alternatively, the two sections may be joined by welding, adhesives, or other techniques for sealing a fluidtight housing appropriate to the material, the fluids, the pressures involved, etc.

Referring now as well to FIGS. 2–5, each of the adjacent faces of the inlet and exhaust sections 22, 24 defines a recess 28, 30, respectively. The two recesses 28, 30 together define a single chamber 32. An 0-ring or other sealant 34 is disposed within the chamber 32 to insure a fluidtight connection therebetween about the periphery of the chamber 32.

Figure 2:
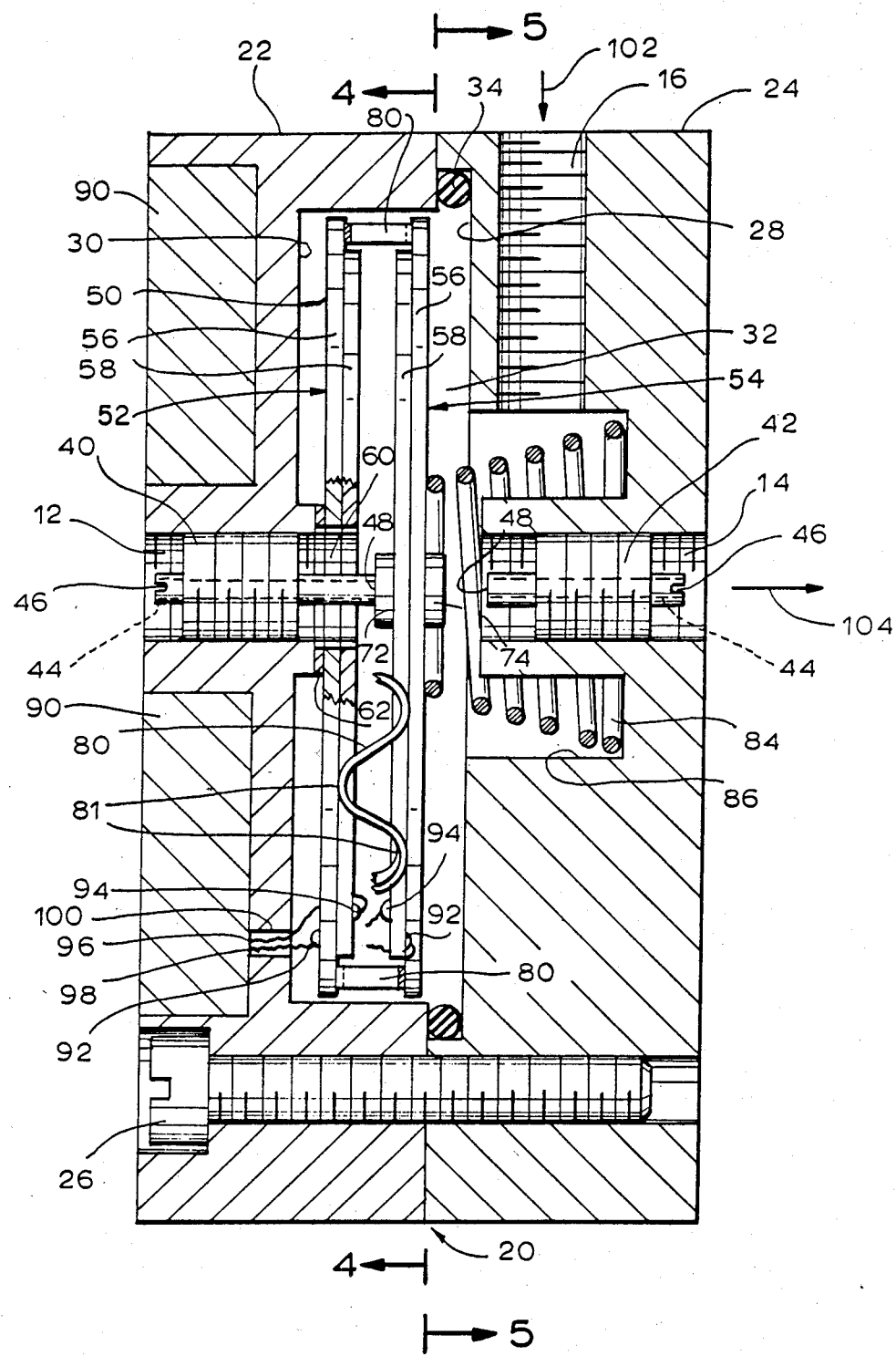
FIG. 2 is a fragmentary sectional view taken along the line 2—2 of FIG. 1 and in the direction of the arrows, but to an enlarged scale, showing the piezoelectric members in a de-energized state.
Figure 3:
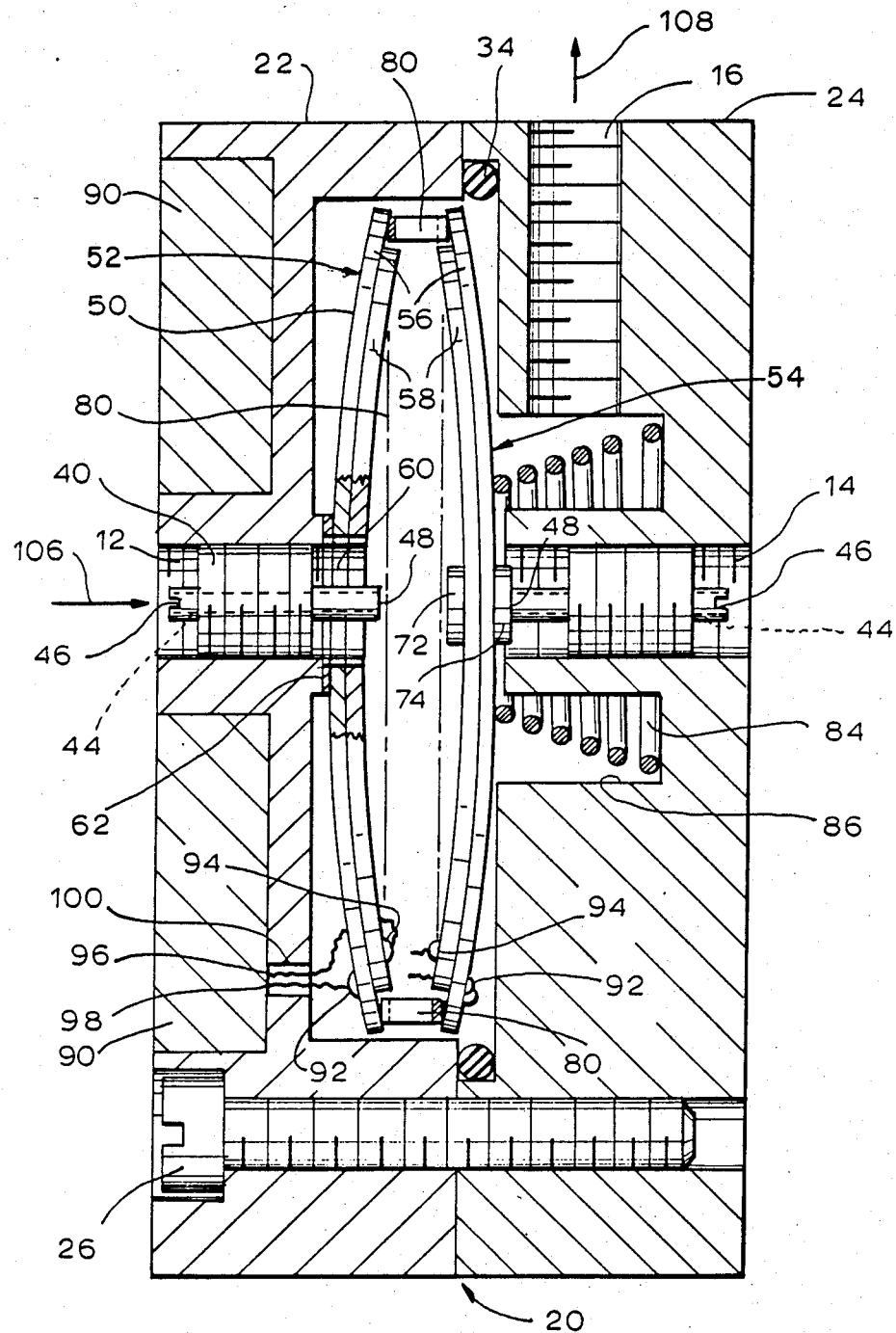
FIG. 3 is a view similar to FIG. 2, but showing the piezoelectric members in an energized state.

The first and second ports 12, 14 are internally threaded and adapted to receive therein externally threaded ferrules 40, 42, respectively. Each ferrule 40, 42 defines a hollow cylindrical central core 44 having an outer end 46 (remote from the chamber 32) and an inner end 48 (adjacent the chamber 32). The outer end 46 of each ferrule 40, 42 is slotted to receive a screwdriver or other adjusting tool (not shown) so that the externally threaded ferrule 40, 42 may be rotated relative to the internally threaded valve port 12, 14 to control the positioning of the inner end 48 along the port axis, within either the valve port 12, 14 or the chamber 32. As illustrated in FIGS. 2 and 3, the inner end 48 of the inlet ferrule 40 (that is, the ferrule 40 within the inlet port 12) is well within the chamber 32, while the inner end 48 of the exhaust ferrule 42 (that is, the ferrule 42 within the exhaust port 14) is still substantially within the exhaust port 14. It will be appreciated that the effective diameters of the valve ports 12, 14 are the inner diameters of the cores 44 of the ferrules 40, 42 as the fluids traverse the valve pots 12, 14 only through such cores 44.

The ferrules 40, 42, like the housing sections 22, 24, may be made of metal or other rigid material (such as particular plastics), depending upon the particular application intended and, in particular, the fluids to be encountered. For example, corrosive fluids will require the deployment of non-corrosible material for the housing sections 22, 24, the ferrules 40, 42, and such other portions of the valve 10 as are exposed to the corrosive fluid.

Unlike the inlet and exhaust ports 12, 14, the inlet/outlet port 16 contains no ferrule. As this port 16 is never blocked, there is no need to provide an adjustable effective disposition. Nonetheless, the inlet/outlet port 16 may be internally threaded to facilitate the engagement therein of externally threaded members for connecting it with a remote device such as a pneumatic cylinder. As illustrated, the inlet/outlet port 16 extends transverse to the aligned inlet and exhaust ports 12, 14, but alternate orientations are equally useful.

Disposed within the chamber 32 of valve body 20 is a diaphragm, generally designated 50. The diaphragm 50 includes a plurality of piezoelectric members generally designated 52, 54. Generally a pair of piezoelectric members suffices but, where additional excursion is required, a greater number of piezoelectric members may be used, the members being arranged so that, for an end piezoelectric member, the excursions of each piezoelectric member are cumulative. As is conventional in a piezoelectric valve, each piezoelectric member 52, 54 is composed of a thin, electrically conductive substrate 56, such as a metal, having disposed thereon on one side in a thin layer a piezoelectric material 58. Both the substrate 56 and the piezoelectric material 58 have the configuration of a disc in the illustrated embodiment, although other configurations may be used as well. The piezoelectric material 58 preferably does not extend as far as the periphery of the substrate 56. The piezoelectric material 58 of each member 52, 54 face each other —that is, they are on the inner surfaces of the piezoelectric members 52, 54, while the substrates 56 face the valve ports 12, 14—that is, they are on the outer surfaces of the members 52, 54. When appropriately energized (for example, by the application of a 200 volt dc potential), each piezoelectric material 58 contracts and causes its substrate 56 to bow outwardly and assume a convex configuration. Clearly the nature of the connection between the piezoelectric material 58 and the substrate 56 must be flexible in order to accommodate the desired deflection.

It is a critical feature of the present invention that adjacent piezoelectric members 52, 54 are so arranged in the diaphragm 50 that they are adapted to be selectively piezoelectrically deflected in opposite directions in a plane of operation thereof to produce a cumulative excursion, thereby to selectively block or unblock a valve port 12, 14. More particularly, in the diaphragm 50 the piezoelectric members 52, 54 are adapted to be selectively piezoelectrically deflected between a first orientation wherein the members 52, 54 are substantially curved and bowed apart, as shown in FIG. 3, and a second orientation wherein the members 52, 54 are substantially planar and generally parallel, as shown in FIG. 2. The members 52, 54 assume the first orientation when they are energized for piezoelectric deflection and the second orientation when they are not energized and thus not piezoelectrically deflected.

The diaphragm 50 is of lesser diameter than the chamber 32 and slightly spaced radially inwardly from the surrounding surface of the housing 20 (and in particular the inlet section 22) so that the chamber 32 defines a travel path for at least a portion of the diaphragm 50, that is, the portion of the diaphragm 50 which is not fixedly secured to the housing 20 in the manner described immediately below.

Inlet piezoelectric member 52 (that is, the member 52 adjacent the inlet port 12) defines a central aperture 60 therethrough to enable passage of the core 44 of inlet ferrule 40 to pass therethrough. A thin, flat, centrally apertured annular member 62, such as a washer, annular spacer, annular piece of tape, or an adhesive, is disposed intermediate a margin of the inner surface of the inlet section 22 about the inlet port 12 and a margin of the outer surface of the substrate 56 of the inlet piezoelectric member 52 about the aperture 60. The annular element 62 fixedly secures the inlet piezoelectric member 52 to the inlet section 22 and may conveniently be formed with adhesive on each face thereof for this purpose. Securing the inlet piezoelectric member 52 to the inlet section 22 in this manner insures a continued alignment of the inlet port 12 and the inlet piezoelectric member aperture 60, this alignment being more tenuous when the diaphragm 50 is allowed to float freely in the chamber 32 without being securely anchored to the housing 20. While the annular element 62 provides one means for securing the diaphragm 50 to the inlet section 22 to insure continued alignment of inlet port 12 and aperture 60, yet providing sufficient flexibility and freedom of movement to allow the piezoelectric member 52 to deflect; clearly other means may be used to this end.

Secured by adhesives or the like to opposite faces of exhaust piezoelectric member 54 (that is, the piezoelectric member 54 adjacent the exhaust port 14) for movement therewith are an elastometic inlet pad 72, secured to piezoelectric material 58 facing the inlet port 12 and aligned with the inner core end 48 of inlet ferrule 40, and an elastometic exhaust pad 74, secured to substrate 56 facing the exhaust port 14 and aligned with the inner core end 48 of exhaust ferrule 42. The pads 72, 74 act as valve seats for the ferrules 40, 42. While the use of separate inlet and exhaust pads 72, 74 is preferred, clearly alternative arrangements may be employed. For example, the exhaust piezoelectric member 54 may be apertured and a single elastometic element may extend through the aperture so that its ends act as the inlet and exhaust pads 72, 74 of elastometic material secured to the piezoelectric material 58 and substrate 56, respectively. It will be appreciated that, while the central portion of the inlet piezoelectric member 52 is fixedly secured to the housing inlet section 22, the central portion (that is, the elastometic pads 72, 74) of the exhaust piezoelectric member 54 is free to move in both directions along the axis defined by the inlet and exhaust ferrule cores 44.

The diaphragm 50 further includes flow channel means 80 disposed intermediate the piezoelectric members 52, 54 (and in particular intermediate the facing surfaces of substrates 56) to enable the flow of fluid intermediate the members 52, 54 between the center thereof and the periphery thereof. The flow channel means 80 may be adhesively or otherwise secured to both piezoelectric members 52, 54 to define a subassembly for movement as a unit. The flow channel means 80 defines a path intermediate the piezoelectric members 52, 54 from adjacent the center thereof, where fluid is discharged from the inlet ferrule inner end 48, to adjacent the periphery thereof, where fluid is received by the chamber 32. A preferred flow channel means 80 is a convoluted washer member, the radially inner surface of which is preferably at least slightly spaced radially outwardly beyond the radially outer surface of the piezoelectric material 58 and the convolutions 81 of which are effective to permit fluid flow from a center point (aligned with the inlet ferrule core end 48) outwardly past the periphery of the piezoelectric members 52, 54 into the chamber 32 and ultimately, in or out inlet/outlet port 16. The diaphragm 50 is of lesser diameter than the chamber 32 and slightly spaced radially inwardly from the surrounding surface of the inlet section 22 so that fluid discharged at the periphery of the diaphragm 50 enters the chamber 32 and hence can flow into the inlet/outlet port 16. Accordingly, inlet/outlet port 16 is in fluid communication alternately with an unblocked one of the inlet port 12 and the exhaust port 14. The fluid communication between the inlet/outlet port 16 and the exhaust port 14 is direct via chamber 32, whereas the fluid communication between the inlet/outlet port 16 and the inlet port 12 is indirect, via the flow channel means 80 and chamber 32. Alternatively, the flow channel means can be a series of apertures formed in the exhaust piezoelectric member 54, radially outwardly beyond the elastometic pads 72, 74, or any other means by which fluid can flow past the exhaust piezoelectric member 54.

A spiral compression spring 84 has its large base seated in a groove of the output section 24 surrounding the exhaust port 14 and its small end bearing on the substrate 56 of the exhaust piezoelectric member 54 about the elastometic pad 74 thereon (but spaced sufficiently from the pad 74 so as not to interfere with its functioning). The spring 84 biases the diaphragm 50 towards the inlet valve port 12 so as to unblock the exhaust port 14 and block the -inlet port 12 when the piezoelectric members 52, 54 are not energized (see FIG. 2). The surface of the inlet section 22 about inlet port 12 (in conjunction with annular member 62) acts on the central portion of the inlet piezoelectric member 52, limiting movement of the member 52 towards the inlet port 12.

Each of the piezoelectric members 52, 54 is connected to an annular power supply 90 disposed in the external face of the inlet section 22 by a wire 92 engaging the substrate 56 and a wire 94 engaging the piezoelectric material 58. To insure simultaneous energization of both piezoelectric members 52, 54, the two wires 94 are connected to the power supply 90 by a single common wire 96 and the two wires 92 are connected to the power supply 90 by a single common wire 98. In order to enable passage of the wires 96, 98 from the chamber 32 to the power supply 90, a small hole 100 is provided in the wall of inlet section 22 separating the power supply 90 and the chamber 32. The hole 100 may be sealed about the wires 96, 98 or, alternatively, the power supply 90 may be used to block the hole 100 to prevent fluid egress.

The voltage and AC/DC nature of power supply 90 may vary with the particular application and the particular diaphragm 50 employed in the valve. The power supply 90 is fed by a power source (not shown). The power supply 90 may be activated and de-activated remotely by radio signals. For example, upon receipt of the appropriate input signals, the power supply 90 may deliver an output signal of appropriate potential across each of the piezoelectric members 52, 54 via the appropriate wires 92, 94, 96, 98. Hard wired signals may also be used as input to control operation of the power supply 90. The power supply may, among other functions, convert the input signal to an appropriate output voltage for energizing the piezoelectric members, typically in the range of 200 volts dc. While other voltages may be employed, the voltage must be high enough to effect deflection of the piezoelectric members 52, 54, but low enough not to overstress them so that they do not return to their original orientation or develop cracks.

To initialize the valve 10 prior to use, the ferrules 40, 42 are rotated by means of the slotted outer core ends 46 so that the inner core ends 48 are positioned such that in the deenergized state flow through inlet port 12 is completely blocked and in the energized state flow through exhaust port 14 is entirely blocked. Inlet/exhaust port 16 is secured to the desired external device, such as a pneumatic cylinder. Where desired, an appropriate fluid inlet source (not shown) may be connected to the outer portion of inlet port 12, and an appropriate exhaust receptacle (not shown) may be secured to the outer portion of exhaust port 14. Alternatively, any one or more of the ports 12, 14, 16 may communicate directly with the ambient atmosphere.

Referring now in particular to FIG. 2, when the valve 10 is in the deenergized state so that the power supply 90 is not energizing the piezoelectric members 52, 54, the piezoelectric members 52, 54 are substantially planar and parallel. The natural or at rest (i.e., deenergized) configuration of the exhaust piezoelectric member 54, secured to the housing 20 by annular member 62 and assisted by the bias exerted thereon by spring 84, causes the elastometic pad 72 to block the inlet ferrule inner end 48 to preclude fluid flow through inlet port 12. At the same time, exhaust gases discharged in the direction of arrow 102 into the inlet/outlet port 16 (here acting as an inlet port) enter the chamber 32 and subsequently exhaust ferrule inner end 48 for discharge through exhaust port 14 in the direction of arrow 104.

Referring now in particular to FIG. 3, when the valve 10 is in the energized state so that the piezoelectric members 52, 54 are energized by power supply 90, the piezoelectric members 52, 54 are substantially curved and bow outwardly, the inlet piezoelectric member 52 towards the inlet port 12 and the exhaust piezoelectric member 54 towards the exhaust port 14. The inlet piezoelectric member 52 is actually fixed to the inlet section 22 about the inlet port 12 by means of the annular member 62 so that its outward bowing results in deflection of the transverse centerline of the diaphragm 50 (the transverse centerline being perpendicular to the axis of the inlet and exhaust ports 12, 14) towards the exhaust port 14. Cumulative or additive to this excursion of the inlet piezoelectric member 52 is the outward bowing of the exhaust piezoelectric member 54 against the bias of the compression spring 84. The cumulative effect is to space the inlet-side elastometic pad 72 from the inlet ferrule inner end 48 and to cause the exhaust-side elastometic pad 74 to block the exhaust ferrule inner end 48 and thereby terminate fluid flow through the exhaust port 14. Fluid emerging from the inlet ferrule inner end 48 in the direction of arrow 106 is discharged intermediate the piezoelectric members 52, 54 at the center thereof, eventually passes along the various convolutions 81 of the involuted flow channel means 80 to the periphery of the piezoelectric members 52, 54 and ultimately discharges into the chamber 32. As the exhaust port 14 is blocked, the fluid flows out of the inlet/outlet port 16 to the external pneumatic cylinder in the direction of arrow 108.

Once the power supply 90 ceases to energize the piezoelectric material 58 of the piezoelectric members 52, 54, the piezoelectric members return to their original configuration, assisted by the urging bias of spring 84, with the transverse centerline of the entire diaphragm 50 returning to its original position.

The primary advantage of the piezoelectric valve of the present invention relative to the conventional piezoelectric valve using a similar diaphragm will become apparent from the following discussion. It will be recalled from the previous discussion that in a conventional piezoelectric valve having a diaphragm of a single piezoelectric member with an excursion of 0.010 inch the usable excursion was only 0.006 inch due to the need to allow a "lost" excursion of 0.002 inch at each end for engagement of the piezoelectric member with a valve port (or, more particularly, the engagement of the elastometic pad of the piezoelectric member with the ferrule core inner ends). By way of contrast, in a valve according to the present invention, the total excursion of an end piezoelectric member of a diaphragm composed of N piezoelectric members (similar to those specified in previous discussion) would be N×0.010 inch. For a valve according to the present invention having two such piezoelectric members, the total excursion is 2×0.010 or 0.020 inch. As there are still only two elastometic pads to engage the two ferrule inner ends, the "lost" excursion remains 2×0.002 or 0.004 inch. Accordingly, the maximum usable excursion of the valve is 0.020-0.004 or 0.016 inch, substantially more than double the maximum usable excursion of a conventional piezoelectric valve with a single piezoelectric member of the same configuration (that is, substantially more than 2×0.006 or 0.012 inch). Significantly, the increase in excursion permits a substantial increase in the diameter of the valve port. In the example given here, when there are two piezoelectric members, the maximum usable valve port diameter is 0.064 inch instead of the 0.024 inch when a single piezoelectric member is used.

As a result of the enhanced maximum usable excursion, the piezoelectric valve of the present invention may be used to control valve ports (i.e., ferrule inner ends) of substantially greater cross-section than a conventional piezoelectric valve using a single comparable piezoelectric member and a comparable applied voltage, and to do so while consuming only a fraction of the power of a solenoid valve. In fact, since fluid flow through the valve is proportional to the area of the valve port, an increase in diameter of the valve port to 0.064 inch from 0.024 inch results in an increase in fluid flow of in excess of 7 times.

Alternatively, the present invention enables the use of a lower voltage applied to the piezoelectric members, thus reducing the total travel of each piezoelectric member and thereby enhancing its fatigue life.

It will be apparent that many modifications may be made in the valve without departing from the principles of the present invention. For example, diaphragm 50 may be turned around 180° such that the apertured piezoelectric member 52 is secured to the exhaust section 24 about the exhaust port 14 and the disposition of the ferrules appropriately adjusted so that the diaphragm in the deenergized orientation blocks the exhaust port rather than the inlet port and in the energized orientation blocks the inlet port rather than the exhaust port. Or the diaphragm may contain more than two piezoelectric members 52, 54, the piezoelectric members preferably being arranged with adjacent members bowing in opposite directions when energized so that the cumulative excursion of one end member of the diaphragm is substantially equal to the sum of the individual excursions of the several piezoelectric members.

To summarize, the present invention provides a piezoelectric valve in which the effective usable excursion of the diaphragm exceeds the usable excursion of a conventional piezoelectric valve using a similar diaphragm, providing at least twice the usable excursion and enabling use of the valve to control a valve port having a greater cross-sectional area than the a valve port in a conventional piezoelectric valve using a similar diaphragm, and hence a greater flow rate through the valve, or to enhance fatigue life without sacrificing flow. The piezoelectric valve is of compact and sturdy design, inexpensive to manufacture and easy to maintain.

It will be appreciated that the drawings are not to scale and that the separation between the piezoelectric members and the size of the flow channel means have been greatly exaggerated for illustrative purposes.

For the purposes of clarity of explanation and illustration, the piezoelectric members 52, 54 have been described throughout the specification and claims as being substantially or generally planar and substantially or generally parallel in their non-energized state and shown as planar and parallel in their non-energized state in FIG. 2. This will normally be the case where the piezoelectric member 54 is stiff relative to the force of compression spring 84 bearing thereon. However it will be understood that where the force of compression spring 84 is high relative to the stiffness of piezoelectric member 54, the compression spring 84 will cause the central portion of piezoelectric member 54 to bow slightly towards the opposed central portion of piezoelectric member 52. A reference to the piezoelectric members 52, 54 being substantially or generally planar and substantially or generally parallel, as these terms are used herein, encompasses such a slight bowing.

Now that the preferred embodiments of the present invention have been shown and described in detail, various modifications and improvements thereon will become readily apparent to those skilled in the art. Accordingly, the appended claims are to be construed broadly and in a manner consistent with the spirit and scope of the present invention.

I claim:

1. A piezoelectric valve for controlling fluid flow through a valve port, comprising:
   (A) a fluid-tight valve body defining a pair of valve ports;
   (B) a diaphragm disposed within said valve body and including a plurality of piezoelectric members, said members being selectively piezoelectrically deflectable in opposite directions in a plane of operation thereof in response to voltages applied thereto to produce a cumulative excursion to selectively assume one of two functionally opposite positions relative to one of said valve ports, said members in one of said positions operatively blocking said one valve port and in the other of said positions unblocking said one valve port, at least one of said members being disposed intermediate said pair of valve ports; and
   (C) electrical means operatively connected to said members for piezoelectrically deflecting the same to one of said positions.

2. The piezoelectric valve of claim 1 wherein said members are adapted to be selectively piezoelectrically deflected between a first orientation wherein said members are bowed apart and a second orientation wherein said members are generally parallel, said members assuming said first orientation when said electrical means are energized to piezoelectrically deflect said members and said second orientation when said electrical means are de-energized so said members are not piezoelectrically deflected.

3. The piezoelectric valve of claim 1 for controlling a fluid flow through said valve port and a second valve port, wherein said valve body further defines a second valve port aligned with said valve port, said valve port is an inlet port and said second valve port is an exhaust port, said valve port and second valve port are said pair of valve ports, and at least one of said members is disposed intermediate said valve port and second valve port.

4. The piezoelectric valve of claim 3 wherein piezoelectric deflection of said members to selectively block or unblock said valve port also selectively unblocks or blocks said second valve port.

5. The piezoelectric valve of claim 1 for providing 3-way valve action for controlling a fluid flow among said valve port and second and third valve ports, wherein said valve body further defines second and third valve ports.

6. The piezoelectric valve of claim 1 wherein said valve body limits the excursion of one of said members.

7. The piezoelectric valve of claim 6 wherein said valve body blocks the excursion of one of said members in a given direction and thereby substantially doubles the effective excursion of the other of said members in the opposite direction.

8. The piezoelectric valve of claim 7 wherein said valve body blocks the excursion of said one member in a given direction and thereby substantially more than doubles the effective usable excursion of said other member in the opposite direction.

9. The piezoelectric valve of claim 7 additionally comprising means for biasing said members in the given direction.

10. The piezoelectric valve of claim 1 wherein said electrical means are functionally electrically connected to a common electrical circuit for simultaneous piezoelectric deflection of said plurality of members.

11. The piezoelectric valve of claim 1 wherein said members are substantially planar when not piezoelectrically deflected and substantially curved when piezoelectrically deflected.

12. The piezoelectric valve of claim 1 wherein said valve ports are in spaced and generally opposite disposition to each other.

13. A piezoelectric valve for controlling fluid flow through a valve port and a second valve port, comprising:
   (A) a fluid-tight valve body defining a valve port and a second valve port aligned with said valve port, said valve port being an inlet port and said second valve port being an exhaust port;
   (B) a diaphragm disposed within said valve body and including at least a pair of piezoelectric members, said members being selectively piezoelectrically deflectable in opposite directions in a plane of operation thereof in response to voltages applied thereto to produce a cumulative excursion to selectively assume one of two functionally opposite positions relative to said valve port and said second valve port, said members in one of said positions operatively blocking said valve port and operatively unblocking said second valve port and in the other of said positions operatively unblocking said valve port and operatively blocking said second valve port, said valve port extending through one of said pair of said members, and the other of said pair of said members having a first face for selectively blocking or unblocking said valve port and an opposed second face for selectively blocking or unblocking said second valve port; and
   (C) electrical means operatively connected to said members for piezoelectrically deflecting the same to one of said positions.

14. The piezoelectric valve of claim 13 wherein said one member has a central annular portion fixed to said valve body about said valve port to thereby substantially double the effective excursion of said other member.

15. The piezoelectric valve of claim 14 additionally including an annular element having opposed faces, one face being secured to said central annular portion of said one member and the opposite face being secured to said valve body about said valve port.

16. The piezoelectric valve of claim 14 additionally comprising means for biasing said members towards said valve port.

17. The piezoelectric valve of claim 14 providing 3-way valve action for controlling a fluid flow among said valve port, said second valve port and a third valve port, wherein said valve body additionally defines said third valve port, said third valve port being an inlet-/outlet port, said third valve port being in fluid communication with an unblocked one of said valve port and said second valve port.

18. The piezoelectric valve of claim 17 wherein said diaphragm additionally includes flow channel means disposed intermediate said members to space the members apart and enable the flow of fluid intermediate said members between the center thereof and the periphery thereof.

19. The piezoelectric valve of claim 18 wherein said valve port extends through said central annular portion of said one member, and an unblocked valve port communicates with the end of said flow channel means adjacent the center of said members, an unblocked second valve port communicates with said third valve port directly, and said third valve port communicates with the end of said flow channel means adjacent the periphery of said members, thereby providing fluid communication between said third valve port and alternately an unblocked one of said valve port and said second valve port.

20. The piezoelectric valve of claim 18 wherein said flow channel means is annular in configuration.

21. The piezoelectric valve of claim 20 wherein said flow channel means is a convoluted washer.

22. A piezoelectric valve for controlling fluid flow through a valve port, comprising:
- (A) a fluid-tight valve body defining a pair of spaced and generally opposed valve ports;
- (B) a diaphragm including at least a pair of piezoelectric members and a flow channel means disposed between and spacing said members apart, said members being selectively piezoelectrically deflectable in opposite directions in a plane of operation thereof in response to voltages applied thereto to produce a cumulative excursion to selectively assume one of two functionally opposite positions relative to one of said valve ports, said members in one of said positions operatively blocking said one valve port and in the other of said positions operatively unblocking said one valve port, said valve body precluding the excursion of one of said members in a given direction and thereby substantially doubling the effective excursion of the other of said members in the opposite direction, at least one of said members being physically disposed intermediate said pair of valve ports; and
- (C) electrical means operatively connected to said members for piezoelectrically deflecting the same to one of said positions, said electrical means being functionally electrically connected to a common electrical circuit for simultaneous piezoelectric deflection of both of said members, said members being substantially planar when not piezoelectrically deflected and substantially curved when piezoelectircally deflected.

23. A piezoelectric valve for providing three-way valve action for controlling a fluid flow among first, second and third valve ports, comprising:
- (A) a fluid-tight valve body defining first, second and third valve ports;
- (B) a diaphragm disposed within said valve body and including at least a pair of piezoelectric members, said members being selectively piezoelectrically deflectable in opposite directions in a plane of operation thereof in response to voltages applied thereto to produce a cumulative excursion to selectively assume one of two functionally opposite positions relative to first said valve port and said second valve port, said members in one of said positions operatively blocking said first valve port and operatively unblocking said second valve port and in the other of said positions operatively unblocking said first vale port and operatively blocking said second valve port, said first valve port being an inlet port extending through a central portion of said one member, said second valve port being an exhaust port aligned with said first valve port, and said third valve port being an inlet/outlet port in fluid communication with the periphery of said members and with one of said first and second valve ports when the same is unblocked, said other member having a first face for selectively blocking or unblocking said first valve port and an opposed second face for selectively unblocking or blocking said second valve port;
- (C) electrical means operatively connected to said members for piezoelectrically deflecting the same, said electrical means being functionally electrically connected to a common electrical circuit for simultaneous piezoelectric deflection of both of said members, said members being substantially planar when not piezoelectrically deflected and substantially curved when piezoelectrically deflected;
- (D) means for biasing said members towards said first valve port
- (E) means for securing a central annular portion of said one member to said valve body about said first valve port to preclude excursion of said one member in a given direction and thereby to substantially double the effective excursion of said other member in the opposite direction; and
- (F) flow channel means disposed between and spacing said members apart comprising a convoluted washer disposed in said diaphragm intermediate said members to enable the flow of fluid intermediate said members between the center thereof and the periphery thereof;

said valve thereby providing fluid communication between said third valve port and an unblocked one of said first valve port and said second valve port.

* * * * *